United States Patent [19]
Sidorenko et al.

[11] 4,394,865
[45] Jul. 26, 1983

[54] APPARATUS FOR DETERMINING LEVELS OF PHYSICAL LOADS

[75] Inventors: Georgy I. Sidorenko; Vladimar I. Stankevich; Vitaly V. Katsygin; Georgy P. Lopato, all of Minsk, U.S.S.R.

[73] Assignee: Belorussky Nauchnoissledovatelsky Institut Kardiologii, Minsk, U.S.S.R.

[21] Appl. No.: 223,269

[22] Filed: Jan. 8, 1981

[30] Foreign Application Priority Data

May 22, 1980 [SU] U.S.S.R. .............................. 2920298
May 22, 1980 [SU] U.S.S.R. .............................. 2920300

[51] Int. Cl.³ .............................................. A61B 5/10
[52] U.S. Cl. ..................... 128/782; 73/653; 73/379; 272/DIG. 5
[58] Field of Search ............ 128/774, 779, 782; 73/654, 653, 379, 517 AV; 324/208; 335/206; 272/DIG. 5, DIG. 6; 235/105

[56] References Cited

U.S. PATENT DOCUMENTS

4,165,501 8/1979 Bongort et al. ..................... 335/206

FOREIGN PATENT DOCUMENTS

301534 8/1971 U.S.S.R. .
469053 8/1975 U.S.S.R. .

OTHER PUBLICATIONS

"Body Speedometer", JS&A Group, Inc., Nov. 1978.
IEEE Trans. on Biomed. Eng., vol. BME-28, No. 6, Jun. 1981, pp. 467-471.

*Primary Examiner*—Kyle L. Howell
*Assistant Examiner*—John C. Hanley
*Attorney, Agent, or Firm*—Fleit, Jacobson & Cohn

[57] ABSTRACT

An apparatus for determining levels of physical loads, having a housing with two switching elements disposed therein and electrically coupled to an indicator and through a cut-out switch to a power supply unit. The apparatus further comprises a seismic mass constituted by a permanent magnet and secured in the housing by means of elastic suspension elements. The switching elements are positioned along the direction of movement of the seismic mass. The indicator includes three indicating elements indicating, respectively, the minimum, the optimum and the maximum level of physical load. One of the switching elements is a group of magnetically operated hermetically sealed changeover contacts, while the other switching element is a pair of magnetically operated hermetically sealed normally open contacts, said group of changeover contacts including a normally open contact connected to one of the terminals of the indicator element indicating the minimum level of physical load, a normally closed contact connected to one of the terminals of the indicator element indicating the optimum level of physical load, and a common contact connected to one of the terminals of the power supply unit and to one of the contacts of said pair of contacts the other contact of which is connected to one of the terminals of the indicator element indicating the maximum level of physical load. The other terminals of the indicating elements of the indicator through the cut-out switch are connected to the other terminal of the power supply unit. The seismic mass is positioned in the zone of operation of said group of changeover contacts.

7 Claims, 3 Drawing Figures

APPARATUS FOR DETERMINING LEVELS OF PHYSICAL LOADS

FIELD OF THE INVENTION

The present invention relates to apparatuses for registering loads exerted on an individual performing a movement, and more particularly to apparatuses for determining levels of physical loads.

The present invention can be used in medical scientific research, in medical practice, in sports, in curative physical culture exercises, in health resort service, and in space medicine.

BACKGROUND OF THE INVENTION

Routine physical exercise has long been extolled by virtually every medical authority as essential to good health and longevity. Because of modern conveniences and work-saving technology, the average person expands today less physical energy than did his counterparts in generations past. As a result, the current generation by and large does not get the physical exercise necessary for good health. Insufficient training of the human heart, as well as constantly increasing emotional stresses and inadequate physical loads, cause a steady increase in the number of people having cardiovascular disorders.

As far as lethality and invalidization of people are concerned, cardiovascular disorders come first in the world.

In the recent years there has been an awakening to the need for a more systematized approach to the problem of physical exercise. Particularly, individuals in the over-thirty years age bracket are having routine exercise prescribed by their physicians as a preventive measure against heart disease and other associated cardiovascular disorders. Numerous recent publications have recognized a correlation between physical fitness and exercise and have delineated detailed regimens of programs of exercise intended to yield the desired results. The exercise must be performed only under medical supervision in respect to physical loads and the physical activity of the individual.

Known in the art is a pedometer consisting of a seismic mass and a mechanical counter (cf. U.S.S.R. Author's Certificate No. 301,534).

The operation of this pedometer is based on perception of the oscillations of the body center of gravity of a moving individual by the seismic mass. Each oscillation of the seismic mass is transmitted through a push rod to the mechanical counter which registers these oscillations. The pedometer counts all the oscillations of the individual in the vertical plane. This leads to false counts with the result that the counted number is somewhat greater than the actual number of steps.

Known in the art is an apparatus for determining levels of physical loads (cf. U.S.S.R. Author's Certificate No. 469,053) having a housing which incorporates a serial arrangement of a transducer for converting the oscillations of the body center of gravity of a person into an electrical signal, a pulse shaper, and an electrical signal counting/indicating unit. A power supply unit is connected to the pulse shaper and to the counting/indicating unit. The transducer includes switching elements constituted by two pairs of contacts respectively disposed in the toe tip portion and in the heel portion of the insole of a shoe. These pairs of contacts are connected in parallel with each other and are closed at the moment the foot touches the ground (or a support) during walking or running. The counting/indicating unit is an electromechanical counter which is actuated at the time of application of a pulse from the output of the pulse shaper. When at least one pair of contacts of the transducer is closed, an accumulating element at the input of the pulse shaper is also closed with the result that redistribution of charges occurs and a current pulse is thus produced to activate the pulse shaper which, in turn, also generates a pulse. The latter causes the indicating/counting unit to change its reading.

In the course of medical rehabilitation of cardiac patients it is necessary to restrict physical activity of individuals to predetermined limits. For this purpose it is sufficient to supply the person with information on the relative level of physical load which can be exerted on the person during movement. Rehabilitation proceeds normally if the person is subjected to physical loads below a predetermined optimum level. If the loads exerted on the person exceed the optimum level, the risk of recurrence of infarction increases.

The known apparatus for determining levels of physical loads does not permit the exerciser to distinguish between levels of physical loads according to the amounts of expended physical energy.

SUMMARY OF THE INVENTION

Accordingly, it is an object of the present invention to provide an apparatus for determining levels of physical loads, which is capable of determining and indicating levels of physical loads exerted on a person according to the relative amounts of physical energy expended by the person.

It is another object of the present invention to provide an apparatus for determining levels of physical loads, which is capable of determining and indicating levels of physical loads exerted on a person with due regard for the anthropometric characteristics of the person.

It is still another object of the present invention to provide an apparatus for determining levels of physical loads which is capable of determining and indicating levels of physical loads exerted on a person and makes it possible to adjust the limits of the levels of physical loads.

With these and other objects in view there is proposed an apparatus for determining levels of physical loads, having a housing with two switching elements disposed therein and electrically coupled to an indicator and through a cut-out switch to a power supply unit, which apparatus, according to the invention, further comprises a seismic mass constituted by a permanent magnet secured in the housing by means of elastic suspension elements, the switching elements being positioned along the direction of movement of the seismic mass, the indicator including three indicating elements indicating, respectively, the minimum, the optimum and the maximum level of physical load, one of the switching elements being a group of magnetically operated hermetically sealed changeover contacts, the other switching element being a pair of magnetically operated hermetically sealed normally open contacts, said group of changeover contacts including a normally open contact connected to one of the terminals of the element indicating the minimum level of physical load, a normally closed contact connected to one of the terminals of the element indicating the optimum level of physical load, and a common contact connected to one of the terminals of the power supply unit and to a contact of said pair of normally open contacts the other contact of which is connected to one of the terminals of the element indicating the maximum level of physical load, the other terminals of the indicating elements being connected through the cut-out switch to the other terminal of the power supply unit, and the seismic mass being positioned in the zone of operation of the group of changeover contacts.

By using switching elements one of which is constituted by a group of magnetically operated hermetically sealed changeover contacts and another is constituted by a pair of magnetically operated normally open contacts, and by employing a seismic means constituted by a permanent magnet, with the switching elements being positioned along the direction of movement of the seismic mass, it is possible to convert the oscillations of a human body into information on the relative magnitudes of these oscillations.

The indicator including three indicating elements provides a means for indicating all levels (i.e. the minimum, the optimum and the maximum) of physical load.

It is expedient to provide the apparatus for determining levels of physical loads with a chamber secured in the housing by a locking means, with the seismic mass being secured to the walls of the chamber by means of the elastic suspension elements.

Installment of the seismic mass in the chamber allows the position of the seismic mass to be adjusted in correspondence to the anthropometric characteristics of the individual without disassembling the apparatus.

It is expedient to provide the wall of the housing with a guide channel accomodating a bushing which is movable along the axis of the channel and can be fixed in a predetermined position, with the end of one of the elastic suspension elements being mounted with its one end in the bushing.

The guide channel arranged in the housing and accomodating a bushing which is movable along the axis of the channel and can be fixed in a predetermined position makes it possible to adjust the pull of the elastic suspension elements and to change thereby the moment of inertia of the seismic mass and hence the limits of the levels of physical loads.

The aforementioned and other objects and advantages of the present invention will become more apparent upon consideration of the following detailed description of the preferred embodiments taken in conjunction with the accompanying drawings.

DETAILED DESCRIPTION OF THE INVENTION

Figure 1:
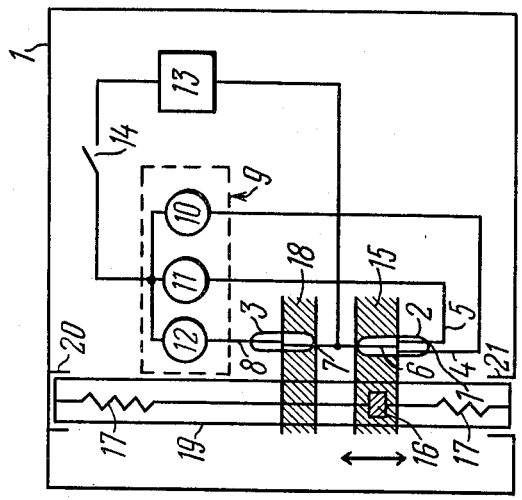
FIG. 1 is a block-diagram of an apparatus for determining levels of physical loads, according to the invention.

The proposed apparatus for determining levels of physical loads comprises a housing 1 (FIG. 1) accomodating a switching element 2 and a switching element 3. The switching element 2 is a group of magnetically operated hermetically sealed changeover contacts consisting of a normally open contact 4, a normally closed contact 5 and a common contact 6. The switching element 3 is a pair of magnetically operated hermetically sealed normally open contacts 7 and 8.

The apparatus further comprises an indicator 9 including three indicating elements 10, 11 and 12. For the sake of convenience, it is expedient to have the indicating elements 10, 11 and 12 made so that they emit green, yellow and red light, respectively.

The element 10 indicates the minimum level of physical load and has one of its terminals connected to the normally open contact 4, the element 11 indicates the optimum level of physical load and has one of its terminals connected to the normally closed contact 5, the element 12 indicates the maximum level of physical load and has one of its terminals connected to the contact 8. The common contact 6 of the switching element 2 is connected to the contact 7 of the switching element 3 and to one of the terminals of the power supply unit 13. The power supply unit 13 has its other terminal connected to the other terminals of the indicating elements 10, 11 and 12 of the indicator 9.

In the zone 15 of operation of the switching element 2 there is positioned a seismic mass 16 constituted by a permanent magnet.

The seismic mass 16 is secured in the housing 1 by means of elastic suspension elements 17 so that it can move along the switching elements 2 and 3 from the zone 15 of operation of the switching element 2 into the zone 18 of operation of the switching element 3.

Figure 2:
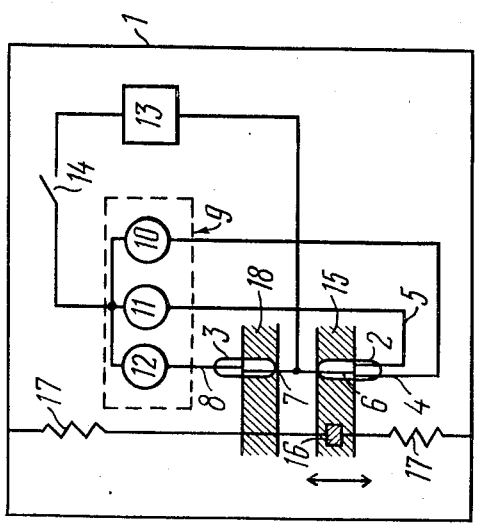
FIG. 2 is a block-diagram of an apparatus for determining levels of physical loads, according to another embodiment of the invention.

FIG. 2 shows another embodiment of the apparatus for determining levels of physical loads. Referring to FIG. 2, the apparatus is provided with a chamber 19 which is positioned in the housing 1 and can be fixedly secured in the housing 1 by means of a locking means 20 which is, for example, a bayonet coupling.

The seismic mass 16 is secured to the walls of the chamber 19 by means of the elastic suspension elements 17.

The chamber 19 is positioned in the housing 1 so that the seismic mass 16 can move along the switching elements 2 and 3.

To provide easy replacement of the chamber 19 with the seismic mass 16 the wall of the housing 1 is provided with a guide channel 21.

The guide channel 21 accomodates a bushing 22 (FIG. 3) which is movable along the axis of the channel 21 and can be fixed in a predetermined position, e.g., by a thread connection.

One of the elastic elements 17 is mounted with its one end in the bushing 22 so that movement of the bushing 22 leads to variation in the pull of the elastic elements 17 but produces no change in their elastic properties.

The apparatus for determining levels of physical loads operates as follows.

Depending on the aim of the study, the apparatus for determining levels of physical loads may be attached to different parts of a person's body. For example, if physical activity of the upper limbs (arms) during work is studied, the apparatus may be positioned on one of the arms of the person. If it is necessary to monitor physical activity of a person performing physical exercise during which the inferior limbs are chiefly engaged (cycling and the like), the apparatus is positioned on one of the feet of the person. If general physical activity of a person is monitored, e.g. during running, walking, bending, jumping and the like, the apparatus is positioned on that part of the body which is most actively engaged in the movements or whose movements are representative of general physical activity of the person, e.g., the apparatus is positioned in the waistband area (near the body center of gravity). In all cases the apparatus is positioned so that the direction of movement of the seismic mass 16 should coincide with that of the body part the movement of which is being studied.

When in use, the housing 1 is attached to the waistband of the person and the power supply unit 13 is connected into the circuit by the use of the switch 14. As this takes place, the element 10 of the indicator 9 lights up because the normally open contact 4 of the switching element 2 is closed (the seismic mass 16 is in the zone 15 of operation of the switching element 2). This will indicate turning on of the apparatus, as well as a minimum level of physical load exerted on the person when the latter stands or performs movements with a minimum amplitude. The indicating elements 10, 11 and 12 may be light-emitting diodes each producing radiation of different colour. If light-emitting diodes are used, they should be correctly poled with respect to the power supply unit 13.

After the apparatus is turned on, the person starts performing movements (running, walking etc.). If the amplitude of oscillations of the body center of gravity of the person is below a certain level, the seismic mass 16 will oscillate on the elastic suspension elements 17 with an amplitude at which it will not leave the zone 15 of operation of the switching element 2 with the result that the indicating element 10 of the indicator 9 will continuously glow (with green light).

If the amplitude of movements of the person exceeds a certain minimum level but remains below an optimum level, then during oscillations the seismic mass 16 will move beyond the zone 15 of operation of the switching element 2 but will not yet reach the zone 18 of operation of the switching element 3 (because the size of the seismic mass 16 is chosen smaller than the gap between the zones 15 and 18). In such a case the normally open contact 4 of the switching element 2 will open, while the normally closed contact 5 will close, whereby the indicating elements 10 and 11 of the indicator 9 will be switched over. Therefore, if the amplitude of movements of the person has a certain optimum level, the indicating elements 10 and 11 will be lighted alternately (by turns), which will mean that the person is subjected to an optimum level of physical load. The length of the interval during which one or the other of the indicating elements remains lighted will depend on which of the levels, the minimum or the optimum one, is closer to the amplitude of movement of the person.

If the amplitude of movements of the person is above a certain optimum level, the seismic mass 16 will begin to enter the zone 18 of operation of the switching element 3 causing it to close its contacts 7 and 8 and to indicate thereby the achievement of a maximum level of physical load (by lighting the indicating element 12).

Thus, alternate lighting of all the elements of the indicator 9 means that a maximum level of physical load has been achieved, the length of the interval during which the element 12 remains lighted being a measure of the actual level of physical load exerted on the person, i.e., of the value by which the optimum level is exceeded.

If the apparatus for determining levels of physical loads is made as shown in FIG. 2, it operates as follows. Before the apparatus is used, with the help of tables or a formula the weight (number) of the seismic mass 16 is determined according to the aponthropometric characteristics of the person. Then the chamber 19 with the chosen seismic mass 16 is inserted into the guide channel 21 of the housing 1 and secured with the locking means 20. The housing 1 is attached to the waistband of the person and the power supply unit 13 is connected into the circuit by the use of the switch 14. As this takes place, the element 10 of the indicator 9 lights up.

Thereupon the apparatus operates as described above.

Figure 3:
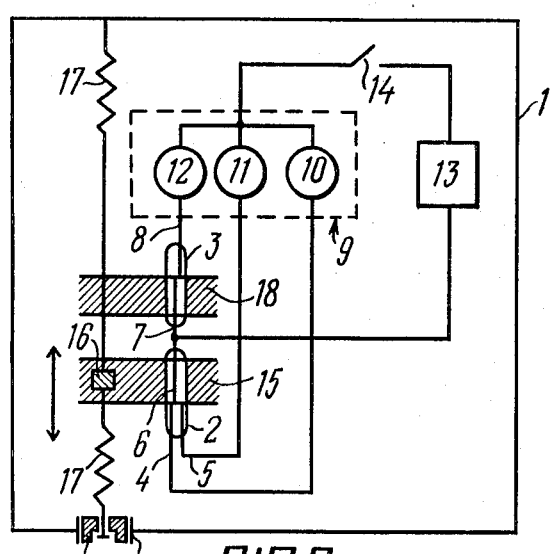
FIG. 3 is a block-diagram of an apparatus for determining levels of physical loads, according to still another embodiment of the invention.

If the apparatus for determining levels of physical loads is made as shown in FIG. 3, it operates as follows. Before the apparatus is used, the bushing 22 is moved in the guide channel 21, e.g. along the thread, whereby the pull of the elastic elements 17 is changed. This provides variation in the limits of the levels of physical load. Such a variation may be required if, because of training or for other reasons, it becomes necessary to readjust the limits of the optimum level of physical load, and hence the limits of the other levels. To provide an accurate adjustment of said limits, the housing of the apparatus may be marked with notches against one of which the notch of the movable bushing 22 is set. The housing 1 is attached to the person and the power supply unit 13 is connected into the circuit by the use of the switch 14. As this takes place, the indicating element 10 of the indicator 9 lights up. Thereupon the apparatus operates as described above.

While the invention is described herein in the terms of the preferred embodiments, numerous modifications may be made without departure from the spirit and scope of the invention as defined in the appended claims.

The apparatus for determining levels of physical loads may be used for determining loads acting on various parts of a person's body, e.g., on the limbs during work or athletic training. Besides, the apparatus is capable of determining the total physical load exerted on a person engaged in physical activity.

The apparatus is capable of determining levels of physical loads exerted on a person with due regard for the anthropometric characteristics of the person.

Thanks to its simplicity, low cost and universality, the apparatus for determining levels of physical loads can be widely used during athletic training or medical rehabilitation. Because of its small size and weight it can also be used during space flights in orbital stations in the process of training during long stay in space.

We claim:

1. An apparatus for determining levels of physical loads, comprising:
    a housing;
    a seismic mass constituted by a permanent magnet;
    elastic suspension means for securing said seismic mass in said housing for movement in a given direction in response to movement of a user carrying the housing;
    a first switching element positioned in said housing along the direction of movement of said seismic mass and constituted by a group of magnetically operated hermetically sealed changeover contacts including a normally open contact, a normally closed contact and a common contact;
    a second switching element positioned in said housing along the direction of movement of said seismic mass and constituted by a pair of magnetically operated hermetically sealed normally open contacts, one of which is connected to said common contact of said first switching element;

an indicator positioned in said housing and including a first indicating element for indicating a first, minimum level of physical load and having a first terminal and a second terminal, a second indicating element for indicating a second level of physical load greater than the minimum level and having a first terminal and a second terminal, and a third indicating element for indicating a third level of physical load greater than the second level and having a first terminal and a second terminal, said first terminal of said first indicating element of said indicator being connected to said normally open contact of said first switching element, said first terminal of said second indicating element of said indicator being connected to said normally closed contact of said first switching element, and said first terminal of said third indicating element of said indicator being connected to the other of said normally open contacts of said second switching element;

a power supply unit having a first output terminal and a second output terminal, said first output terminal being connected to said common contact of said first switching element; and a cut-out switch having a first terminal and a second terminal, said first terminal of said cut-out switch being connected to said second output terminal of said power supply unit and said second terminal of said cut-out switch being connected to said second terminals of said first, second and third indicating elements, said first and said second switching elements being positioned with respect to the direction of movement of said mass such that movement of said mass resulting from changes in levels of physical loads energizes said first indicating element when the level of physical load is less than the second level, energizes said second indicating element when the level of physical load is between said first and said third levels, and energizes said third indicating element when the level of physical load reaches the third level.

2. An apparatus according to claim 1, which is provided with a chamber secured in said housing by means of a locking means, said seismic mass being secured to the walls of said chamber by means of said elastic suspension means.

3. An apparatus according to claim 1, wherein the wall of said housing has a guide channel, the apparatus further comprising a bushing which is movably positioned in said guide channel, and means for fixing said bushing in a predetermined position, said elastic suspension means including an element having one end mounted in said bushing so that variation in the position of said bushing varies the rate of movement of said seismic mass in response to changes in physical load.

4. An apparatus for determining levels of physical activity comprising:
a housing;
a seismic mass constituted by a permanent magnet;
elastic suspension means for securing said mass in said housing for movement along a path and for holding said mass in a rest position, said mass being movable from said rest position by physical activity of a user carrying the housing;
a first switching element positioned in said having along the path of movement of said seismic mass and constituted by a group of magnetically operated hermetically sealed change-over contacts including a normally open contact, a normally closed contact spaced from said normally open contact along the path of movement, and a common contact, said normally open contact and said normally closed contact being interrelated so that closing of one opens the other;
a second switching element spaced from said first switching element and positioned in said housing along the path of movement of said seismic mass and constituted by a pair of magnetically operated hermetically sealed normally open contacts, one of which is connected to said common contact of said first switching element;
an indicator positioned in said housing and including a first indicating element for indicating closing of said normally open contact of said first switching element and having a first terminal and a second terminal; a second indicating element for indicating closing of said normally closed contact upon movement of said mass resulting from a predetermined level of physical activity and having a first terminal and a second terminal; and a third indicating element for indicating closing of said contacts of said second switching element upon movement of said mass resulting from a level of physical activity exceeding the predetermined level by a predetermined amount and having a first terminal and a second terminal; said first terminal of said first indicating element of said indicator being connected to said normally open contact of said first switching element, said first terminal of said second indicating element of said indicator being connected to said normally closed contact of said first switching element, and said first terminal of said third indicating element of said indicator being connected to the other of said normally open contacts of said second switching element;
a power supply unit having a first output terminal and a second output terminal, said first output terminal being connected to said common contact of said first switching element; and
a cut-out switch for controlling supply of power from said power supply unit and having a first terminal and a second terminal, said first terminal being connected to said second output terminal of said power supply unit and said second terminal being connected to said second terminals of said first, second and third indicating elements, the positioning of said first and said second switching elements and the relationship between said first and said second switching elements, said indicator, and said cut-out switch being such that said first indicating element is energized by closing of said cut-out switch, said second indicating element is energized when said mass moves a first predetermined distance from said rest position, and said third indicating element is energized when said mass moves a second predetermined distance from said rest position, said second predetermined distance being greater than said first predetermined distance.

5. An apparatus according to claim 4, wherein only one of said first and said second indicating elements is energized at a given time, the frequency of energization being a measure of physical activity.

6. An apparatus for sensing and for generating signals representative of a first level of physical load, a second level higher than said first level of physical load, and a third level higher than said second level of physical load, said apparatus comprising:

a housing;

a seismic mass comprising a permanent magnet;

elastic suspension means within said housing having first and second elements for supporting said seismic mass for movement in a given direction, said first element being secured to said housing and said seismic mass;

means installed in said housing for adjusting said levels of sensed physical load, said second element being secured between said seismic mass and said means for adjusting;

a first switching element positioned in said housing along the direction of movement of said seismic mass and constituted by a group of reed relays including a normally open contact, a normally closed contact, and a common contact and having a zone of operation defining said first level of physical load, said seismic mass being positioned within a zone of operation of said first switching element when the sensed level of physical load is less than the second level;

a second switching element positioned in said housing along the direction of movement of said seismic mass within the operating range thereof and constituted by a pair of normally open reed switches, wherein one of said switches is coupled to a common contact of said first switching element, said second switching element having a zone of operation determining said third level of physical load, wherein an intermediate zone between said zones of operation of said switching elements defines said second level of physical load;

indicator means positioned in said housing and including a first indicating element for indicating said first level of physical load and having a first lead-out and a second lead-out, a second indicating element for indicating said second level of physical load and having a first lead-out and a second lead-out, and a third indicating element for indicating said third level of physical load and having a first lead-out and a second lead-out, said first lead-out of said first indicating element of said indicator means being connected to said normally open contact of said first switching element, said first lead-out of said second indicating element of said indicator means being connected to said normally closed contact of said first switching element, and said first lead-out of said third indicating element of said indicator means being connected to the other of said normally open contacts of said second switching element;

power supply means for said apparatus having a first output terminal and a second output terminal, said first output terminal being connected to said common contact of said first switching element; and cut-out switch means having a first lead-out and a second lead-out, said first lead-out of said cut-out switch means being connected to said second output terminal of said power supply means and said second lead-out of said cut-out switch means being connected to said second lead-outs of said first, second and third indicating elements.

7. An apparatus as claimed in claim 6, wherein said means for adjusting levels of physical load is made in the form of a guide channel in the wall of said housing, the apparatus further comprising a bushing which is movably positioned in said guide channel and fixable in a predetermined position, one of said elements of said elastic suspension being mounted at one end in said bushing so that the position of the bushing determines the levels of the sensed physical loads.

* * * * *